United States Patent
Weyman et al.

(10) Patent No.: US 7,274,703 B2
(45) Date of Patent: Sep. 25, 2007

(54) STACKABLE NETWORK UNITS WITH RESILIENCY FACILITY

(75) Inventors: Raphael J Weyman, Hemel Hempstead (GB); Francisco Aquino, Marlborough, MA (US); David Reinauer, Nashua, NH (US); Jacek A Tulacz, Marlborough, MA (US); Jane A Riegel, Marlborough, MA (US)

(73) Assignee: 3Com Corporation, Marlborough, MA (US)

( * ) Notice: Subject to any disclaimer, the term of this patent is extended or adjusted under 35 U.S.C. 154(b) by 958 days.

(21) Appl. No.: 10/195,503

(22) Filed: Jul. 16, 2002

(65) Prior Publication Data

US 2003/0169748 A1 Sep. 11, 2003

Related U.S. Application Data

(60) Provisional application No. 60/363,046, filed on Mar. 11, 2002.

(51) Int. Cl.
*H04L 12/28* (2006.01)
*H04L 12/56* (2006.01)

(52) U.S. Cl. .................................... 370/401
(58) Field of Classification Search ............... None
See application file for complete search history.

(56) References Cited

U.S. PATENT DOCUMENTS

| | | | | |
|---|---|---|---|---|
| 5,473,599 A * | 12/1995 | Li et al. | ...................... | 370/219 |
| 5,796,740 A | 8/1998 | Perlman et al. | | |
| 5,809,222 A * | 9/1998 | Kizu et al. | ...................... | 714/4 |
| 5,815,668 A * | 9/1998 | Hashimoto | .................. | 709/238 |
| 6,148,410 A * | 11/2000 | Baskey et al. | .................. | 714/4 |
| 6,195,688 B1 * | 2/2001 | Caldwell et al. | ............ | 709/208 |
| 6,397,260 B1 * | 5/2002 | Wils et al. | .................. | 709/238 |
| 6,751,191 B1 * | 6/2004 | Davar et al. | ................. | 370/217 |
| 6,885,667 B1 * | 4/2005 | Wilson | ....................... | 370/392 |
| 6,901,076 B2 * | 5/2005 | Perlman et al. | ............. | 370/401 |
| 6,954,436 B1 * | 10/2005 | Yip et al. | .................... | 370/254 |

FOREIGN PATENT DOCUMENTS

| | | |
|---|---|---|
| EP | 0518595 A2 | 12/1992 |
| EP | 0518596 A1 | 12/1992 |
| WO | WO 02/45356 A2 | 6/2002 |

* cited by examiner

*Primary Examiner*—Huy D. Vu
*Assistant Examiner*—Blanche Wong (57) ABSTRACT

A network unit comprises a multiplicity of ports for transmitting and receiving data packets, a bridging facility and a routing facility. The network unit has a multiplicity of mutually exclusive states which includes an initial state from which said network unit can transition to either a slave state; or a waiting state from which in the absence of receipt from elsewhere of a broadcast advertisement including an advertised address corresponding to an address of the unit, the unit transitions to a master routing state in which the routing facility is enabled and the unit broadcasts a corresponding advertisement including an address of the unit. The unit transitions from the waiting state, when it receives from elsewhere (i.e., another unit) such a broadcast advertisement, to a master bridging state in which the routing facility is disabled and the unit provides commands for disabling a routing facility of other similar units to which the network is connected. The states include a slave routing state, in which the routing facility is enabled, and a slave bridging state, in which the routing facility is disabled. In the slave states the advertisements are not broadcast and the unit responds to routing enabling and disabling commands from a unit in a master state. The scheme provides in conjunction with external connectivity resilience in the event of a cascade failure.

16 Claims, 6 Drawing Sheets

STACKABLE NETWORK UNITS WITH RESILIENCY FACILITY

REFERENCE TO RELATED APPLICATION

This application claims the priority of U.S. provisional application No. 60/363,046 filed Mar. 11, 2002. The contents thereof are hereby incorporated by reference.

FIELD OF THE INVENTION

This invention relates generally to packet-based communication networks and more particularly to network units, such as units capable of routing and bridging, which are stackable to constitute a single network entity. More particularly the invention relates to the provision of 'resilience' to allow the units in a stack, or remaining units in a stack, to continue to operate notwithstanding the failure of a cascade connection between the units of the stack.

BACKGROUND TO THE INVENTION

Network units such as switches and routers which include a multiplicity of ports for connection to other units or users are commonly made with a fixed number of ports in order to achieve efficiency of manufacture. It is known to 'stack' such units, by which is meant their connection in a cascade which enables them not only to receive and forward packets from their own ports but also to forward packets to other units in the stack if a destination port is on a unit other than the unit which first received the packets. Packets which are passed between the units for this purpose travel on the cascade connection, which may consist of ordinary links between cascade ports on the units but may be in more sophisticated form, such as described in GB patent 2365718. A unit needs at least one bi-directional cascade port which can communicate in the up and down directions (or at least two unidirectional ports for the same purpose) but may have more than the minimum number of cascade ports.

Units which are in a cascaded stack communicate between themselves so that the individual units are aware of which of the units are in the stack and for a variety of other purposes not directly relevant to the invention. Control of the units and communication between them may be 'in band', by means of control or management packets sent by way of the packet data path which constitutes the cascade but may be 'out of band' where the control information is sent by way of control messages on a separate control data path.

For a variety of purposes, it is desirable in a stack of units for a particular unit to be, in respect of at least some functions of the stack, a 'lead' or 'master' unit and for the other units to be 'subordinate' or 'slaves'. The terms 'master' and 'slave' are not intended to connote a relationship wherein the 'master' unit performs all the relevant functions and the 'slaves' are merely completely driven by the master. For example, and is more particularly described here and after, an embodiment of the invention comprises a stack of units which are each capable of routing and bridging and are organized so that the unit which receives a packet on one of its external ports performs any necessary routing operation; however, where the packet has a destination port on a different unit, the packet is then bridged to the destination port. In this context, the 'master' will perform certain ancillary functions, such as an advertising function in a routing protocol, whereas the subordinate slaves need not.

It will be understood that 'routing' and 'bridging' are used in the ordinary senses wherein bridging relates to a switching operation occurring on the same LAN or sub-LAN and does not normally involve any change of the address data in the packet. On the other hand, 'routing' refers to a process wherein there is a change of network or sub-network and there is commonly a change of the address data in a packet, such as for example changing the destination MAC address.

The invention is particularly concerned with operation in, according to the OSI model, 'layer 2', which relates to media access control addresses, and 'layer 3', which relates to 'network' or 'IP' addresses.

The present invention is particularly concerned with the provision of 'resilience' against failure of a cascade connection between the units in the stack. In the event of such a failure, if units in both 'halves' or segments of the stack continue to provide full functional capability, such as for example full routing functionality, then two such units may exist on potentially the same network with the same identity, causing an ambiguous situation for any device wishing to communicate through them. An important example is where the stack performs an election to select a 'lead' or 'master' router and there is in consequence a supply of IP addresses from the lead or master router to routing interfaces in the other units of the stack as well as, preferably, the supply of MAC addresses to those router interfaces, as described in U.S. Pat. No. 7,123,615, issued to Ralph Wevman and Maurice Goodfellow on Oct. 17, 2006, commonly assigned herewith and incorporated herein by reference. As is described therein, the failure of an individual unit can be accommodated by a fresh election amongst the other units in the stack so as to provide, if appropriate, a single new lead or master unit. If however the cascade connection is lost and if both 'halves' of the stack continue to offer full routing functionality, then two logical routers can exist on potentially the same local network.

SUMMARY OF THE INVENTION

According to one aspect of the invention a master unit in a stack periodically advertises a network address possessed by that unit, in particular by means of a protocol packet containing that address. According to another aspect of the invention a unit which is potentially a master unit of a segment of a stack detects such an advertised network address and disables the routing facility of the respective unit and preferably also that of any other units to which it is coupled by a cascade connection. A further aspect of the invention is a state machine which provides for a unit the functionality required by those aspects of the invention.

The present invention in a preferred form allows the units of a stack to operate in the following manner in the event of a 'splitting' of the stack into two or more segments. One of those segments would include the master unit: that segment preferably continues to operate uninterrupted. A separated segment comprising one or more none of which is the original master will elect a new (potential) master. This potential master will listen for the existence of another master broadcasting its existence (preferably by means of the discovery protocol message mentioned above) so that if the other (original) master is detected routing will be disabled for the 'separated' segment.

If a stack splits and there is no connectivity between the segments each segment will act as a router for identical interfaces. Should connectivity be re-established between the previously disconnected segments, the masters of the respective segments preferably negotiate to determine which of them will be the single master for the reconnected stack and which therefore will control the routing interfaces.

Further features of the invention will be apparent from the following description and the accompanying drawings.

DETAILED DESCRIPTION

Figure 1:
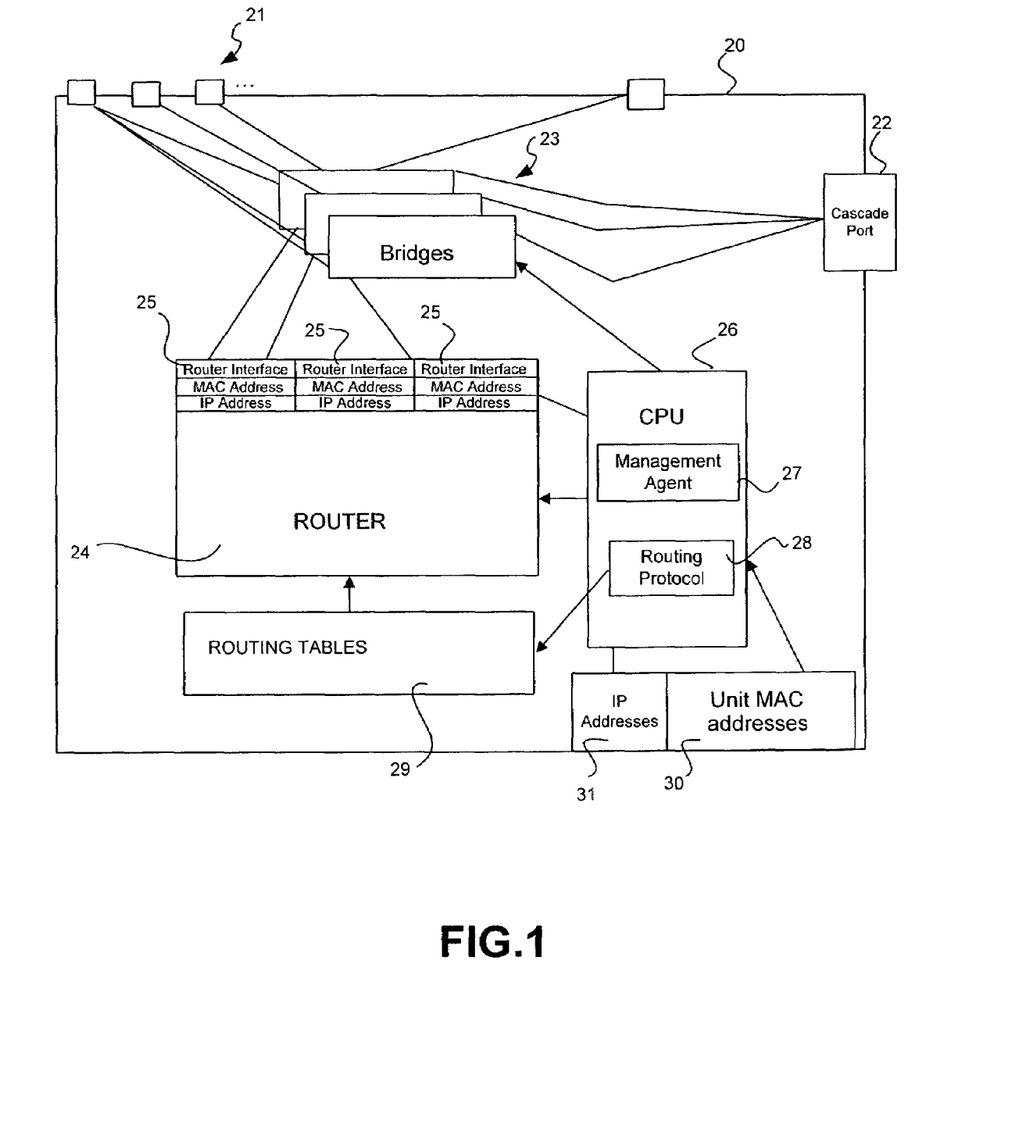
FIG. 1 illustrates part of a network unit organized according to the invention.

FIG. 1 illustrates, in conjunction with FIG. 6 to be described later, a network unit in accordance with the invention and which is to be used in a cascaded stack according, for example, to the schemes shown in FIGS. 2 to 5.

The unit 20 has a multiplicity of ordinary or 'front panel' ports 21 and at least one cascade port 22 The unit includes at least one and usually a multiplicity of 'hardware' bridges, or 'layer 2' switches 23. Each port 21 is connected to at least one of the bridges 23 and the (or each) cascade port is connected to all the bridges, or to a 'logical' port connected to all the bridges. The unit includes a router 24 which has at least two, and in the illustrated example three, router interfaces 25. Each router interface 25 is connected to one bridge only, although each bridge may be connected to more than one router interface 25. For each interface there is some means such as a register storing a MAC address and a network (IP) address for the interface. For controlling the bridges and the router and for establishing the state machine to be described with reference to FIG. 6, there is a processor constituted by a CPU 26 which includes, in appropriate memory, a management agent 27 and a routing protocol 28. The routing protocol controls routing tables 29. Also embedded in the unit, in for example an interface for the management agent, are the unit's normal addresses, i.e. its MAC address(es) 30 and its network (IP) address(es) 31. These addresses are used for the management of the router, for example by an external network supervisor, and would, according to known practice, be supplied by the CPU to the router interfaces. As will become apparent later, the router interfaces can be enabled (in which case the unit can act as a router) or disabled (in which case the unit acts as a bridge).

The routing unit shown in FIG. 1 is in hardware terms in generally known form. The essential purpose of the bridges is to provide switching of packets on, for example, the same subnet or VLAN and to send packets to and from the router 24. Packets received at ports 21 or 22 and not requiring routing will be received by one or other of the bridges and forwarded according to the media access control (layer 2) switching executed by the relevant bridge. The router will normally need to modify the packet to provide it with a new source MAC address, decrementing a 'time to live' (TTL) value in the packet header by unity and usually recomputing a check sum. The router will have recourse to routing tables which are established by means of an appropriate routing information protocol so as to be able to compute a next hop for a routed packet.

It is assumed in this description that the packets which are employed are 'Ethernet' packets, typically conforming to IEEE Standard 802.3. Typically, Ethernet packets include a destination MAC address field, a MAC source address field, a VLAN identifying field, a network protocol (IP) field and an IP check sum field, message data field and a cyclic redundancy check field. Such packets are well known in the art and do not need a further description. However the invention need not be limited to that Standard or to Ethernet systems; it may be applicable in token systems such as the token ring defined in IEEE Standard 802.5.

A unit according to FIG. 1 can be stacked as shown in any of FIGS. 2 to 5. There may be more units in a stack, such as four or eight, but the stacks shown in the Figures are shown with only two or three units for the sake of simplicity. In each of FIGS. 2 to 5 the cascade connection is shown at 10. Physical realizations of cascade connections are well known per se in the art.

In the preferred examples of the invention all the units in a stack are intended to be capable of routing packets that they receive, and the unit owning the port on which a packet requiring routing is received is the one that routes it. If the egress port is on a different unit then, after routing, the packet will be forwarded by bridging to the unit owning that egress port In this way, although there are multiple routers in the stack, only one will be involved in the routing of any given packet. There will be only one routing hop and so it will appear to entities outside the stack as if the stack contained a single router.

As is described in the aforementioned co-pending applications, the units in the stack may conduct an election, which may be based on the exchange of control packets or frames to determine, in accordance with some predetermined criterion (such as which has the lowest MAC address) which of the units in the stack will be the lead or master and which will be the subordinates or slaves. The significance of this is that the lead or master (hereinafter called simply 'master' for convenience) will conduct the full routing protocols and address resolution protocols whereas the other units (called hereinafter simply 'slaves' for convenience) will have selected ancillary functions relating to these protocols suppressed, so that for example they do not broadcast RIP (routing information protocol) or ARP (address resolution protocol) packets This is consistent with the concept of maintaining a single routing entity in the stack and saves considerably on the occupation of bandwidth (on the cascade and generally) by packets which would otherwise be broadcast according to these protocols.

Furthermore, as also described in the aforementioned co-pending applications, the master router interfaces will employ the same set of IP addresses as for the corresponding interfaces in the other units and preferably the same MAC addresses, as will be explained later. This is achieved by causing one of the routers, particularly the master router, to lend its MAC addresses to the other (slave) units.

The goal of resiliency for (particularly) a stacked router is to allow the router interfaces to remain operational after the failure of a unit in the stack or after the failure of a cascade link between units. To provide this resiliency, appropriate functionality is required within the units; it is also desirable for the units to be able to communicate other than by way of the cascade. For this purpose edge devices connected to the router may be configured with redundant physical links to the router units. Depending on the configuration, different levels of resiliency can be provided for different devices. In general, the trade-off is ports versus resiliency, i.e. the more resilient the configuration, the fewer additional ports are achieved by stacking router units.

Figure 2:
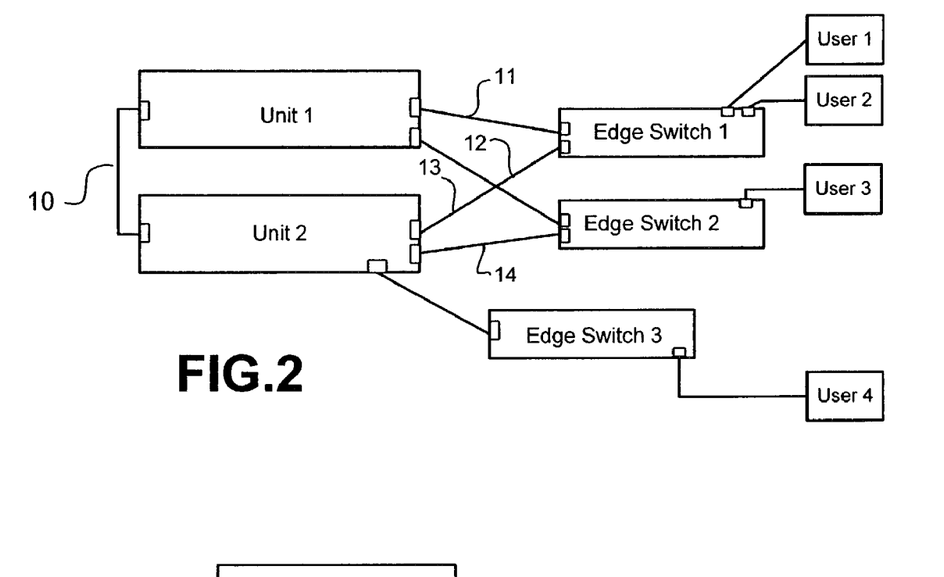
FIG. 2 illustrates one network fragment including a stack of network units.

FIG. 2 shows a simple resilient network.

In FIG. 2 the two stacked units denoted Unit 1 and Unit 2, connected by a cascade link 10 between cascade ports, constitute a dual resilient network core Edge Switch 1 and Edge Switch 2 (which are connected by links to data terminal units or other peripheral units to respective users) are connected to both the stacked units by means of links 11, 12 between respective ports on Unit 1 and Edge Switch 1 and links 13, 14 between respective ports on Unit 2 and Edge Switch 2. The other ports on the Units and Edge Switches have been mostly omitted. In addition to the physical links 11-14, some other configuration restrictions may need to be applied in practice. For example, every VLAN defined on any of the edge switches should be carried by the links between the core and the edge devices, in order to maintain connectivity for all VLANs.

Thus Edge Switches 1 and 2 provide resilient paths for the Users 1 and 2 (connected to ports on Edge Switch 1) and User 3 (connected to a port on Edge Switch 2) because these users will still be connected to an operative unit of the stack despite failure of either Unit 1 or Unit 2.

It will be appreciated that manual (non-LACP) link aggregation cannot be used on the links 11-14. This is because in the event of a cascade failure, the stacked end of the aggregation would have single links, while the edge would be aggregated. The links should be disaggregated or be aggregated using LACP (Link Aggregation Control Protocol). Link aggregation for Ethernet systems is fully described in IEEE Standard 802.3ad-2000 and a practical system for remedial action when an aggregating system splits is described in U.S. Pat. No. 6,819,680, issued to G. Hickman et al. on Nov. 16, 2004.

The network fragment shown in FIG. 2 includes an Edge Switch 3, connected to only one unit in the stack by a link 15. This switch does not provide a 'resilient' path for its users such as user 4, because connectivity is lost if Unit 2 fails. However, if the relevant criteria for connectivity are met (such as that all of the VLANs for Edge Switch 3 are carried on all of the links between the edge switches and the stack units) then Edge Switch 3 will still have connectivity for its VLANS in the event of a failure of cascade link 10 or the failure of Unit 1.

The simple network shown in FIG. 2 can be extended to include multiple stacked units with multiple connected edge switches. Just as Edge Switch 3 in the example has partial resilience with respect to the Units 1 and 2, many configurations are possible that provide various levels of resilience for the Edge Switches.

Thus an Edge Switch has a fully resilient configuration with respect to a stacked router if its VLANs still have full connectivity to the router interfaces after the failure of a single unit on the stacked router or the failure of a single cascade link between two units.

Full resiliency is guaranteed for an edge switch if the following two conditions are met:
(1) There exists a layer 2 path for each of the VLANs configured on the edge switch to every unit in the stacked router
(2) There is a direct connection from the edge switch to at least two units in the stacked router.

These criteria assume that the failure of a unit in the stacked router will not break the cascade connection between the other units.

Single Failure Cases

Figure 3:
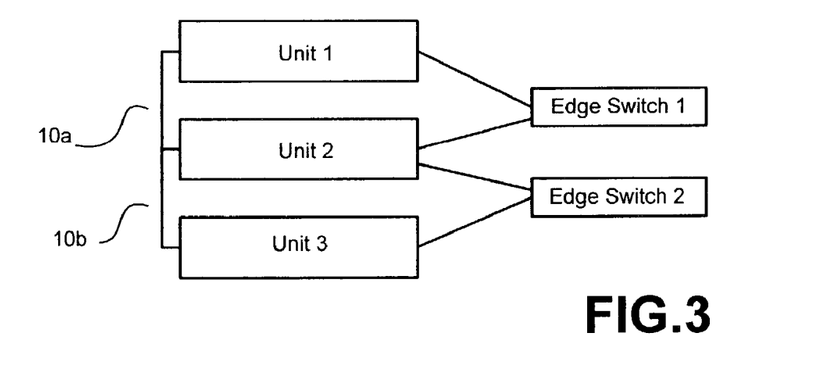
FIG. 3 illustrates another network fragment including a stack of network units.

FIG. 3 shows a three-unit stack wherein Units 1, 2 and 3 provide resilient operation for the two connected Edge Switches 1 and 2.

Below are descriptions of five specific failure cases in the stack shown in FIG. 3. For the sake of example it is assumed that prior to the failure, Unit 1 is the 'master' and Units 2 and 3 are 'slaves'. These cases can be extrapolated to describe the operation of stacks having a greater number of units.

(a) Unit 1 Fails

A new master is elected between Unit 2 and Unit 3. Unit 2 will be selected because it is the lowest numbered unit in the stack after Unit 1 fails. Unit 2 cannot detect Unit 1, so the stack comprising Unit 2 and Unit 3 continues routing.

(b) Unit 2 Fails

Unit 1 remains master and the stack comprising Unit 1 and Unit 3 continues routing.

(c) Unit 3 Fails

Unit 1 remains master and the stack comprising Unit 1 and Unit 2 continues routing.

(d) The Cascade Connection 10a Between Unit 1 and Unit 2 Fails

A new master is elected between Unit 2 and Unit 3. Unit 2 is selected because it is the lowest numbered unit in the remaining stack. Unit 2 detects that Unit 1 is still operational and begins operating in 'Layer 2' mode. Unit 2 directs Unit 3 to operate in 'Layer 2' Mode.

(e) The Cascade Connection 10b Between Unit 2 and Unit 3 Fails

Unit 1 and Unit 2 continue operating unchanged. Unit 3 becomes a master of its single unit stack. Unit 3 detects that a master (Unit 1) is still operational and begins operation in 'Layer 2' mode.

Other Failure Cases

In addition to the basic single failure cases above, the invention may remedy other cases involving multiple faults or user action (e.g. physically relocating units). Each unit in a router stack has the same set of IP interfaces. If these units are split and then connected outside of a stack, there is a potential for two or more routers with duplicate interfaces to be running.

The resiliency implementation will protect against duplicate interfaces running on directly connected routers if this is caused by previously stacked layer 3 units being reconnected outside the stack. The implementation also assumes that the interface configuration on such units has not changed.

In accordance with one aspect of the invention a unit that is the master of a 'Layer 3' stack (i.e. a stack of which the units have their router interfaces enabled) will periodically advertise its existence and an address, preferably by means of broadcasting an ARP request for a network address that it possesses. Before a unit that is the master of a stack segment allows the unit or units in that segment to operate its router interfaces, it will listen for this ARP request to determine if (as evidenced by the ARP request) corresponding interfaces already exist. If another master (i.e. the original master) is detected, the responsive unit (and all units in its stack segment) will operate in Layer 2 mode.

A unit that has detected another master will preferably continue to listen for the ARP transmissions of the master while in 'Layer 2' mode, and attempt to take over as master if the transmissions stop.

Figure 4:
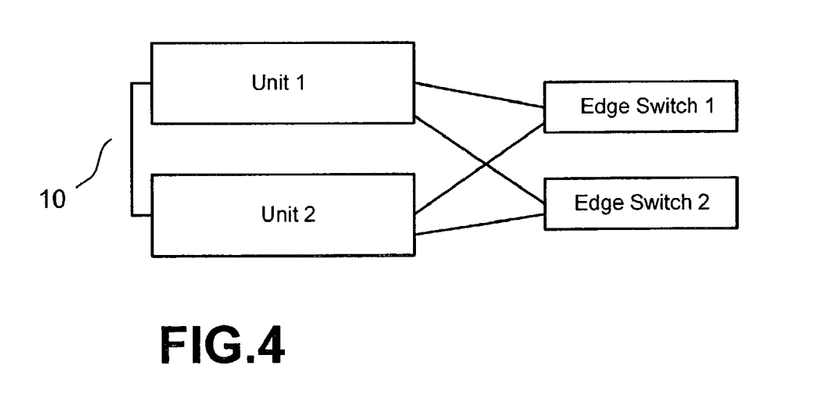
FIG. 4 illustrates a yet further network fragment including a stack of network units.

Thus in the system shown in FIG. 4, if Unit 1 is the master and the cascade connection 10 fails, then Unit 2 will go to 'Layer 2' mode as described earlier. At this point Unit 2 will continue to monitor the ARPs transmitted by Unit 1. If Unit 1 subsequently fails, then Unit 2 will detect the failure and take over the router interfaces.

If Unit 1 is the master and Unit 1 fails, then Unit 2 will become the master as described earlier. If subsequently Unit 1 returns but is no longer in a stack with Unit 2, then Unit 1 will detect the ARP transmissions broadcast by Unit 2 and remain in Layer 2 mode.

Suppose Unit 1 is the master and both units are powered down, the cascade connection 10 is disconnected, and then the units are powered back on. In this case, the unit with the lowest MAC address will become the master. The other unit will go into 'Layer 2' mode and continue to monitor the master in case it fails This scenario assumes the both units are powered on nearly simultaneously. The user can select which unit becomes master in this situation simply by powering up that unit first.

In order to explain the difference between what happens within a stack segment and what happens between the stack segments, reference should now be made to FIG. 5 which illustrates, again in somewhat simplified form, a network including a stack composed of units according to the invention. In this example, the multiport units (for example as described with reference to FIG. 1) constituting a stack are the Units 1 to 4. They have a cascade connection illustrated at 10*a*, 10*b*, and 10*c*. There is external connectivity between Units 1 and 2 by way of Edge Switch 1. There is external connectivity between Units 3 and 4 by way of Edge Switch 2. However Edge Switch 3 (and other Edge Switches to which the Units 1 to 4 may be connected), does not provide any external connectivity between the units of the stack.

Figure 5:
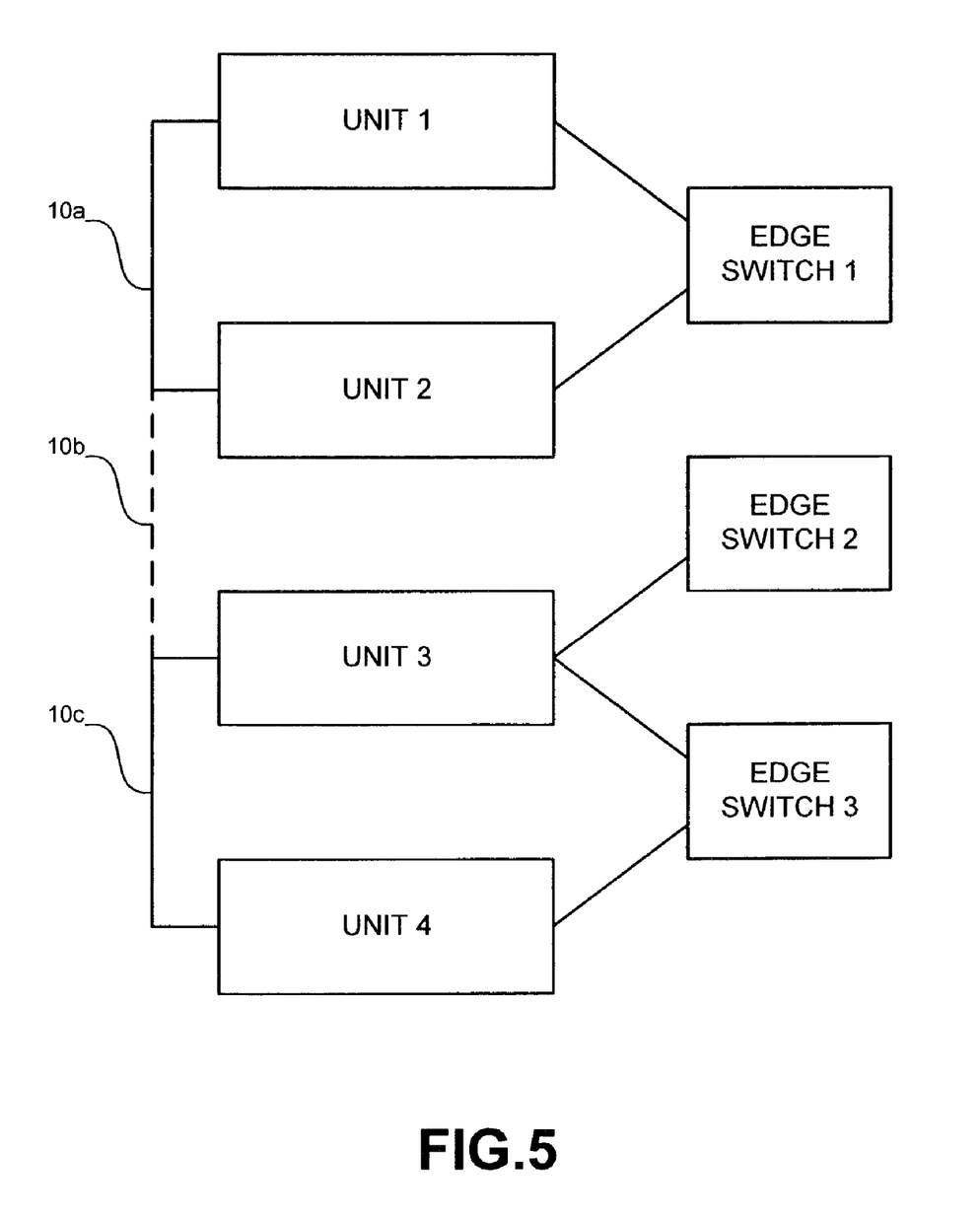
FIG. 5 illustrates a yet further network fragment including a stack of network units.

It should be remarked that in this and the other simple examples connectivity is assumed to exist merely because one of the units of a stack is connected to a port on an Edge Switch which has another port connected to the other unit on the stack. This simple criterion may not be sufficient. For example, connectivity between units may depend on whether they are on the same virtual LAN; other qualifications may also apply. In the specific form of the present invention, 'external connectivity' is intended to mean that the relevant unit can receive other than by way of a cascade connection the advertisements from the original master unit of the stack.

In a network shown for example in FIG. 5, the normal operation of the stack includes the election of a master, by means of the stack protocol which enables the units in the stack to exchange by means of the cascade connection packets containing appropriate operation codes and identify MAC addresses so that an election may be held in accordance with U.S. Pat. Nos. 7,123,615 and 6,819,680. It will be assumed that Unit 1 is elected as the master and therefore all the units in the stack have the same network (IP) addresses for their router interfaces and that the master unit (Unit 1) has lent its MAC address to the other units in the stack.

It will now be assumed that cascade connection 10*b* is interrupted; to illustrate this it is shown in dashed lines. Unit 1 and 2 may continue as before; Unit 1 remains as the master unit for the stack segment constituted by Unit 1 and Unit 2. However, the segment represented by Unit 3 and Unit 4 have no 'master' and therefore will perform a fresh election. It will be assumed that Unit 3 is the new master. As has been remarked, the second segment does not have the required external connectivity with the original segment and accordingly Unit 3 does not receive the advertisements from Unit 1. If there were such an external connection, for example by way of a connection from Edge Switch 3 to Unit 1,; Unit 3 would receive the advertisements and, since there is already a master unit in the stack constituted by the connected segments, Unit 3 would defer to Unit 1, the router interfaces in the second segment would be disabled.

Let it now be assumed that previously interrupted connection 10*b* is restored. There are then two identical and therefore conflicting masters in the stack. Accordingly, the original master Unit 1 and the new master Unit 3 must conduct a negotiation, in practice a determination of which has the lower MAC address, so that the loser of the negotiation ceases to be a master and there is but a single master in the stack.

The functionality required for the stack is preferably implemented as a single state machine in each unit. Normally at any time, every stack will have a single 'master'; all of the other units are slaves. In this embodiment of the invention a stack segment may operate in Layer 3 mode or Layer 2 mode. In Layer 2 mode the router interfaces in each unit of the segment are disabled and the stack segment is effectively a bridge. In Layer 3 mode the router interfaces in each unit of a segment are enabled and the stack segment can route as described with reference to FIG. 1.

The resiliency feature determines which mode the stack or segment is in. Because each unit in a stack has the same set of interfaces, it is possible after stack failures or reconfigurations for more than one unit to attempt to become the router. It is one responsibility of the resiliency feature to detect these conflicts.

Master/Slave Communication

The unit that is the master in the stack (or segment of a stack) determines whether the stack (or segment) will operate in L2 mode or L3 mode based on the resiliency protocol. The master will communicate the mode to other units in the stack by means of packets over the cascade connection using any suitable protocol. Thus a message will be sent from the master to the slave units to direct the slaves to operate in Layer 2 or Layer 3 mode. Upon receipt of this message, the slave unit will generate the corresponding event to the resiliency state machine (RSM) to transition to the indicated mode.

ARP Processing

Figure 8:
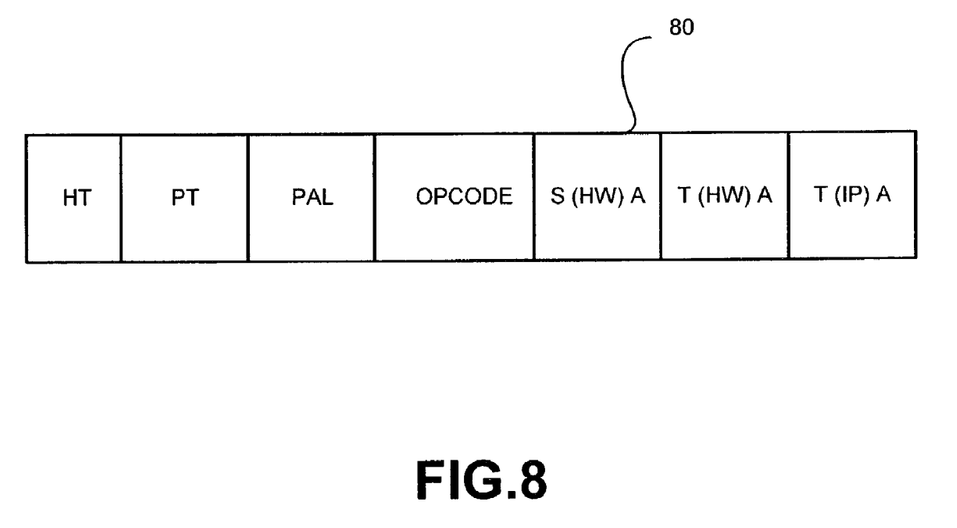
FIG. 8 illustrates schematically a discovery protocol packet.

The resiliency protocol in this example uses discovery protocol packets (constituted by ARP packets) to advertise the existence of a Layer 3 master. The resiliency feature will bypass the normal ARP processing when sending and receiving these ARPs. Received ARP packets will be examined to see if they are part of the resiliency protocol and if so, an event will be posted to the Resiliency State Machine. An example of an ARP packet is shown in FIG. 8.

Master License

As is discussed above, the units in a stack or segment can conduct (preferably periodically) an election to determine which is the master and which the slave or slaves in the stack or segment. A unit which is (currently) a master holds the master license; a unit which does not hold the license is a slave. Loss of the license is denoted hereinafter as an indication (from the CPU or other means which governs the election) of 'LostMaster'; gaining of the license is denoted as an indication of 'GetMaster'. If an existing master retains the license after a new election a 'MasterRetained' indication is produced.

Resiliency State Machine

Figure 6:
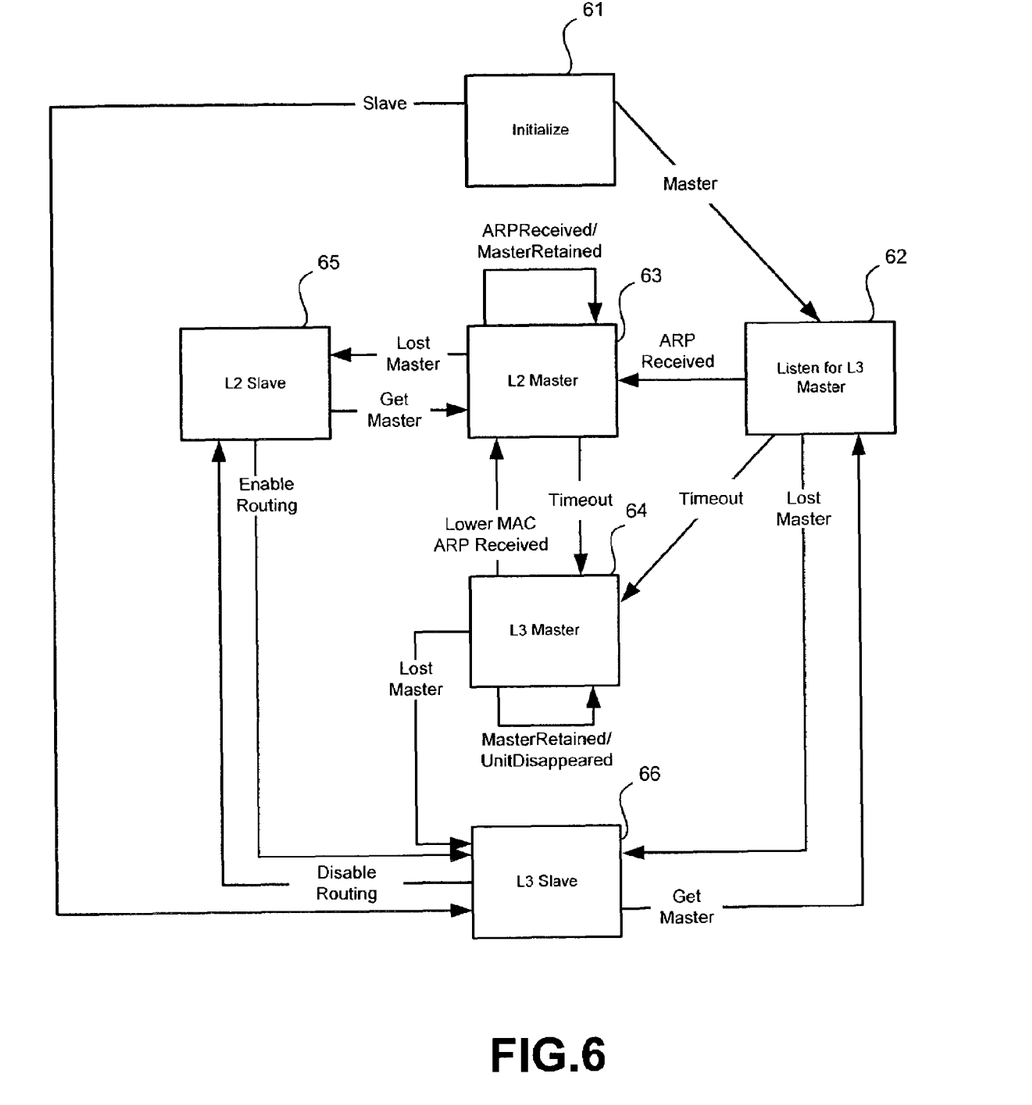
FIG. 6 illustrates a state machine which would be incorporated in a network unit according to FIG. 1.

The state machine in FIG. 6 is the means by which the resilient feature is put into practice. The machine preferably has six principal states 61 to 66 which are described below, as are the preconditions for the transitions between states. The state machine is preferably established in software but a hardware version would be feasible.

At initialization the resiliency state machine is set up by the CPU 26. This will create the resiliency state machine task and enter the initial state The initial state waits for an event indicating whether the unit is a master or a slave. Once one of these events occurs, the processing begins to determine if the unit will operate in Layer 2 mode or Layer 3 mode.

State Machine Description

A description of the state machine follows, in terms of the various states. The various 'events' are defined in a subsequent section. The state machine includes a timer of which the various timing intervals are defined in a subsequent section.

State Descriptions (a) Initialize (61)

The purpose of this state is to wait for the completion of interface configuration. This occurs at start-up or when a slave unit needs to reconfigure its interfaces to agree with the master. The state machine will leave (exit from) this state when the unit has determined, in accordance with the election previously described, whether it is the 'master' or a 'slave' in the stack. If the unit is a master, the state machine sets a timer to a value called herein 'ARP LISTEN TIME' (discussed later and defining presumed maximum time for which it is necessary or appropriate to listen for ARP packets identifying an L3 master which would produce conflict) and transitions to the 'ListenforL3Master' state 62. If the unit is a slave the state machine transitions to the 'L3Slave' state 63.

(b) ListenForL3Master (62)

This state is entered if the unit has been elected a master. The purpose of this state is to make sure no other 'L3 Master' (master of a segment enabled to route) is running before the stack or segment is allowed to run in a routing mode.

If an appropriate ARP request is received, there is already a master of a (different) routing segment and so routing needs to be disabled for units on the local segment The state machine will send a 'DisableRouting' command to all other units in the local segment; set the timer to a value called herein 'ARP RECEIVE TIME'; and transitions to the 'L2 Master' state 63.

If the timer (set in state 61) has timed out (so that no ARP packets identifying a conflicting master have been received, the timer is set to a value called herein 'L3 VIE TIME' and the stack machine transitions to the 'L3 Master' state 54.

If while the machine is in the 'ListenforL3 aster' state 51, a 'LostMaster' indication is received, the state machine transitions to the 'L2 Slave' state 66 (see below).

(c) L2 Master (63)

This is the state wherein the unit is a master but the unit and other units in the segment may bridge but not route.

If a Master ARP is received, then the timer is set to the value 'ARP RECEIVE TIME' and the machine reverts to the same (L2 Master) state.

If ARP timeout occurs (indicating loss of connection with an existing L3 master), then the timer is set to the value 'L3 VIE TIME' and the state machine transitions to the 'L3 Master' state 64.

If in state 63 an indication of 'LostMaster' is received, the state machine transitions to the 'L2 Slave' state 52.

If in state 63 a 'MasterRetained' indication is produced, then a 'DisableRouting' command is sent to all other units in the stack and the state machine reverts to the same 'L2 Master' state.

(d) L3 Master (64)

While in this state the unit will periodically transmit ARP Requests identifying one of its router interfaces. Although not directly relevant to the invention, a unit may have 'default' and non-default interfaces and in practice the identified network address may be that of the lowest numbered non-default interface. If a Lower MAC Master ARP is received, then the machine will (among other actions) send 'DisableRouting' commands to all other units in the segment and transition to the 'L2 Master' state 63.

If the Master License is lost the state machine will transition to the 'L3 Slave' state 66.

If a 'MasterRetained' indication is received the unit will send an 'EnableRouting' command to all other units in the segment and remain in the L3Master state. The same will occur if the unit receives an indication that a unit has 'disappeared' (see below).

(e) L2 Slave (65)

If a 'Master License' indication (GetMaster) is obtained, then the timer is set to the value 'ARP RECEIVE TIME' and the state machine transitions to the 'L2 Master' state 63.

If an 'Enable Routing' command is received, then the routing interfaces are enable and the machine transitions to the L3Slave state 66. This occurs when a segment of which the units may only bridge are allowed to route.

(f) L3 Slave (66)

If Master License is obtained, then the timer is set to the value 'ARP LISTEN TIME' and the state machine transitions to the 'Listen for L3 Master' state 62.

If a 'Disable Routing' command is received, then the routing interfaces are disabled and the state machine transitions to the 'L2 Slave' state 65.

Figure 7:
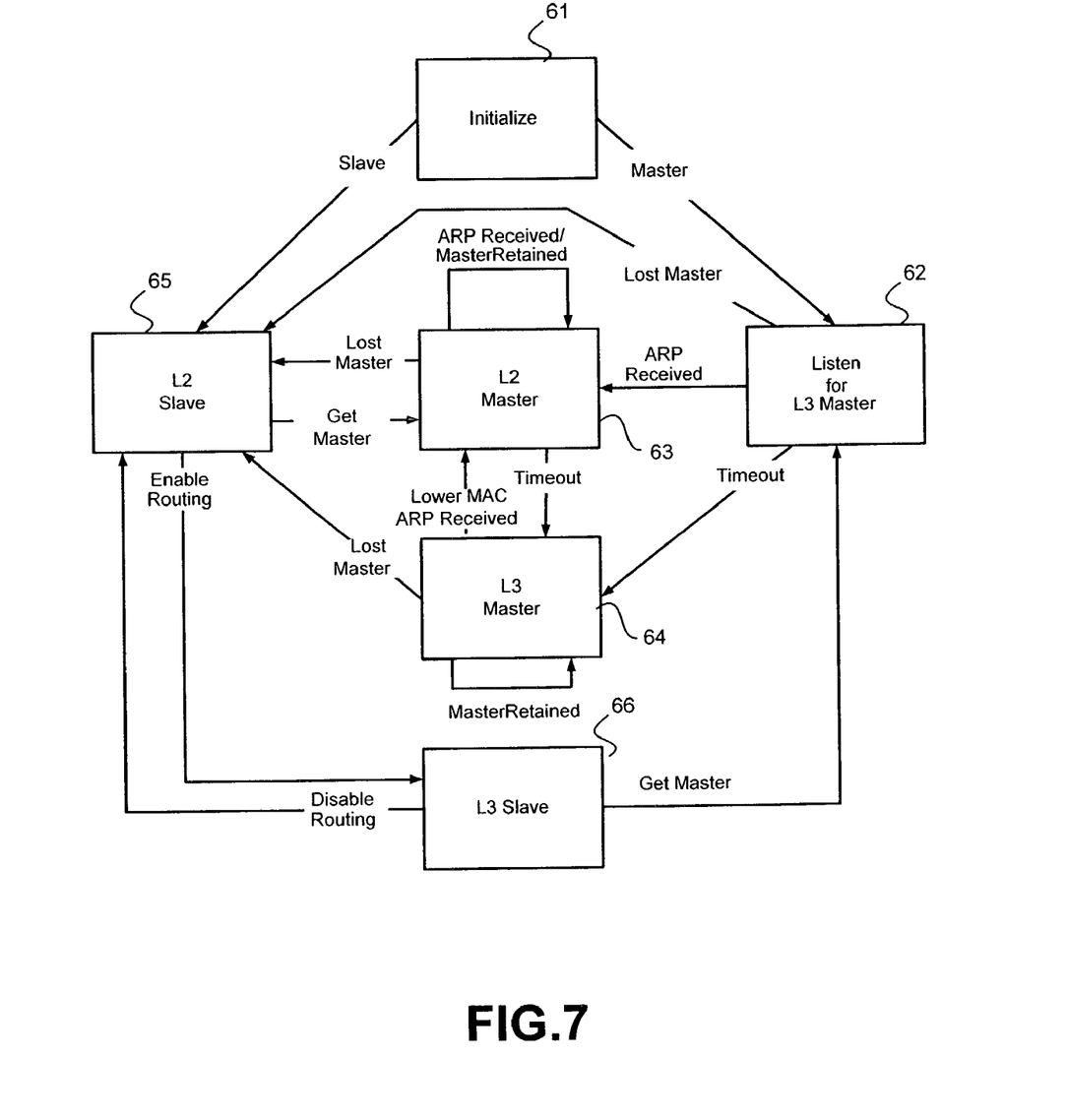
FIG. 7 illustrates a different version of the state machine.

It may be noted that FIG. 6 is not the only way in which the state machine may be organised. For example, the effect of losing the master license in states 62 or 64 may be different both could cause transition to the L2Slave state 65. Moreover, the possible transitions from the Initialise state 61 may be either to the 'Listen for L3Master' state 62 (as in FIG. 6) or to the L2Slave state 65 instead of the L3Slave state 66 (as in FIG. 6). These variations are shown in FIG. 7 wherein the captions have the same meaning as in FIG. 6. However, FIG. 6 is the preferred version.

Event Descriptions

The state machine is controlled by a processing function which detects the relevant preconditions for various 'events'. These events are described below. For ease of understanding they are labelled, though in practice they are in any suitable coded form. An event will have no effect unless the current state is configured to handle the event. The transitions consequent on valid events are apparent from FIGS. 6 and 7.

Initialisation

This event is generated by a generic state machine component to put the state machine (FIG. 6 or 7) into the 'Initialise' state 61.

Master Event

This event is generated when the license manager for the Master License grants the master license.

Slave Event

This event is generated when the license manager for the Master License refuses the master license (i.e indicates that the unit shall be a slave).

Resilient ARP Received

Whenever an ARP packet (of any kind) is received the ARP packet is examined to generate this event if the packet is identified as a Resiliency ARP. The source IP address of the ARP must be equal to the relevant IP address of the receiving unit (e g. the address of the first 'non-default' interface).

Lower MAC Received

If an ARP is received that is identified as a valid resiliency ARP, the source MAC address in the packet is then compared to the MAC address of the first relevant interface of the receiving unit (i.e., the MAC address of the VLAN that the interface is associated with) If the ARP source MAC address is lower then the interface MAC address, a counter is incremented and a timer is started with a value which may be termed for convenience 'LOWER MAC TIME'. If the number of 'lower MAC' ARP packets reaches a limit, denoted herein as 'LOWER MAC ARP LIMIT' lower MAC ARPs are received within this time then the 'LOWER MAC RECEIVED' event is generated. A suitable number depends on the measuring interval and the frequency of the resiliency ARPs. One may choose a number greater than unity but less than the theoretical maximum. Typically these values may be:

'LOWER MAC TIME'—7 seconds
'LOWER MAC ARP LIMIT'—5

Timer Expired

The resiliency state machine uses a single timer event. The value of the timer will vary, depending on the specific state transition Other events defined in the same general format correspond to the LostMaster and MasterRetained indications and the 'Enable Routing' and 'Disable Routing' commands.

Unit Disappeared

At initialization, the resiliency software can register a callback function for the event of a unit leaving the stack (by virtue of physical removal or powering-down); the callback function generates the event 'UNIT DISAPPEARED' to the resiliency state machine The event is described in relation to FIG. 6, above.

Timers

A single timer is created for all of the resiliency state machine timers. The timer is set to different periods, depending on the specific state transition. Preferred but not essential values of these periods are included in the descriptions below.

'ARP LISTEN TIME'

This is the period for which a unit will listen for another Layer3 Master (in the 'LISTEN FOR L3MASTER' state) before transitioning to the 'L3 MASTER' state. This value may be thirty seconds to allow for the twenty to thirty seconds it takes a spanning tree process to unblock a port after a cascade failure. A resilient ARP received during this period will transition the state machine to the 'L2 MASTER' state.

'L3 VIE TIME'

When the 'ARP LISTEN TIME' expires and there is a transition to the L3MASTER state, the timer is set to 'L3 VIE TIME'. This is the time period transmission of the first resilient ARP packet. Any resilient ARP packet received during this period will be checked for lower MAC value. The value may be five seconds.

'ARP RECEIVE TIME'

This is the period which a unit in L2MASTER state allows between received ARPs from the L3MASTER. The timer is reset to this value each time a resiliency ARP is received. The unit transitions to the L3MASTER state if the time expires. The value may be five seconds.

'ARP SEND TIME'

This timer is the period at which the L3MASTER sends out resiliency ARPs. The value may be one second.

ARP Packet

In the preferred form of the invention the advertisement which is produced when a unit is in the master (routing) state is an ARP packet which includes a selected network address, preferably the network address of a router interface. The other important information which may be required to settle a negotiation between two masters is preferably a MAC address of the unit. In general other information could be used (such as some numbering scheme) but the use of MAC addresses is preferable. Moreover, other forms of discovery protocol packets could be used.

FIG. 8 illustrates (in schematic form) an ARP packet 80 which may be employed. The field HT indicates 'hardware type' (in this case 'Ethernet'). Field PT denotes 'protocol type', i.e. IP (0x800). Field HW denotes the address length. Field PAL denotes the protocol address length. 'Opcode' is the operation code for an ARP packet. Field S(HW)A is a MAC address, specifically the MAC address of the VLAN of the first 'non-default' interface. Field S(IP)A is the 'advertised address', specifically in this example the IP address of the first 'non-default' interface. Field T(HW)A is a target hardware address (set to zero). Field T(IP)A is a target IP address, which is the last (highest) address in the internal sub-network used by the stack. It is presumed that it will never be used for a unit address.

We claim:

1. A network unit comprising:
   (a) a multiplicity of ports for transmitting and receiving data packets;
   (b) a bridging facility; and
   (c) a routing facility including at least two routing interfaces which when enabled allow the unit to route data packets and when disabled allow the unit to bridge but not route data packets;
   wherein said network unit has a multiplicity of mutually exclusive states including:
   (i) a master routing state in which the routing interfaces are enabled and the network unit broadcasts an advertisement including an address of the network unit; wherein on entry to said master routing state the network unit provides commands for enabling routing interfaces of other network units to which the network unit is connected;
   (ii) a listening state in which on receipt from another network unit of an advertisement including an advertised address corresponding to an address of said other network unit, the routing interfaces are disabled;

(iii) a master bridging state wherein said router interfaces are disabled and in response to a predetermined absence of said advertisement can transition to said master routing state;

(iv) a slave routing state wherein said router interfaces are enabled and said advertisement is not broadcast; and (v) a slave bridging state wherein said router interfaces are disabled and said advertisement is not broadcast; wherein in said slave bridging state the network unit provides commands for disabling routing interfaces of other network units to which the network unit is connected; and wherein in said slave bridging state the network unit is responsive to an external enabling command to transition from said slave bridging state to said slave routing state and to an external disabling command to transition from said slave routing state to said slave bridging state.

2. A network unit according to claim 1 wherein the network unit in said master routing state is responsive to such an advertisement including an advertised address corresponding to an address of the other network unit and to further information in said advertisement to disable the unit's routing interfaces.

3. A network unit according to claim 1 wherein the further information comprises a media access control address lower than a media access control address of the unit.

4. A network unit comprising:

(a) a multiplicity of ports for transmitting and receiving data packets;

(b) a bridging facility; and (c) a routing facility which when enabled allow the network unit to route data packets and when disabled allows the unit to bridge but not route data packets;

wherein said network unit has a multiplicity of mutually exclusive states, said states including:

(i) a master routing state in which the said routing facility is enabled and the network unit broadcasts an advertisement including an address of the network unit; wherein on entry to said master routing state the network unit provides commands for enabling a routing facility of other network units to which the network unit is connected;

(ii) a listening state in which on receipt from another network unit of an advertisement including an advertised address corresponding to an address of said other network unit, the routing facility is disabled and from which in the predetermined absence of said receipt from said other network of such an advertisement the network unit can transition to said master routing state;

(iii) a master bridging state wherein said router facility is disabled and in response to a predetermined absence of said advertisement can transition to said master routing state;

(iv) a slave routing state wherein said router facility is enabled and said advertisement is not broadcast; and (v) a slave bridging state wherein said router facility is disabled and said advertisement is not broadcast; wherein in said slave bridging state said unit provides commands for disabling a routing facility of said other network units to which the network unit is connected; and wherein in said slave bridging state the network unit is responsive to an external enabling command to transition from said slave bridging state to said slave routing state and to an external disabling command to transition from said slave routing state to said slave bridging state.

5. A network unit according to claim 4 wherein the network unit in said master routing state is responsive to such an advertisement including an advertised address corresponding to an address of said other network unit and to a media access control address in said advertisement, whereby if the media access control address is lower than a media access control address of the unit, the network unit's routing interfaces are disabled.

6. A network unit comprising:

(a) a multiplicity of ports for transmitting and receiving data packets;

(b) a bridging facility; and (c) a routing facility;

wherein said network unit has a multiplicity of mutually exclusive states, said states including:

(i) an initial state from which said network unit can transition to either (ii) a slave state; or (iii) a waiting state from which in the absence of receipt from another network unit of a broadcast advertisement including an advertised address corresponding to an address of the other network unit, the network unit transitions to (iv) a master routing state wherein said routing facility is enabled and the network unit broadcasts a corresponding advertisement including an address of the unit; and wherein the network unit transitions from said waiting state, on receipt from another network unit of said broadcast advertisement, to (v) a master bridging state wherein said routing facility is disabled and the network unit provides commands for disabling a routing facility of other network units to which the network unit is connected.

7. A network unit according to claim 6 wherein said slave state is a slave routing state wherein said routing facility is enabled.

8. A network unit according to claim 6 wherein said slave state is a slave bridging state wherein said routing facility is disabled.

9. A network unit according to claim 6 wherein said corresponding advertisement comprises repeated discovery protocol packets.

10. A network unit comprising:

(a) a multiplicity of ports for transmitting and receiving data packets; said ports including at least one cascade port;

(b) a bridging facility comprising at least two bridges, each port being connected to at least one of the bridges and said cascade port being connected to each of the bridges; and (c) a routing facility comprising at least two router interfaces, each router interface being connected to only one of the bridges;

wherein said network unit has:

(i) a master routing state wherein the routing interfaces are enabled and said network unit broadcasts an advertisement including an address of the unit; and (ii) at least one state in which on receipt from another network unit of an advertisement including an advertised address corresponding to an address of said another network unit, the routing interfaces are disabled.

11. A network unit according to claim 10 wherein said one state is a waiting state prior to entry of the network unit into the master routing state.

12. A network unit according to claim 11 wherein the network unit when in the waiting state is operative in the predetermined absence of said receipt from another network unit of such an advertisement to transition to said master routing state.

13. A network unit according to claim 10 wherein the network unit when in the master routing state is responsive to such an advertisement including an advertised address corresponding to an address of said other network unit and to further information in said advertisement to disable the network unit's routing facility.

14. A network unit comprising:
   (a) a multiplicity of ports for transmitting and receiving data packets; said ports including at least one cascade port;
   (b) a bridging facility comprising at least two bridges, each port being connected to at least one of the bridges and said cascade port being connected to each of the bridges; and
   (c) a routing facility comprising at least two router interfaces, each router interface being connected to one only of the bridges;
   wherein said network unit has a multiplicity of mutually exclusive states, said states including:
   (i) an initial state from which said network unit can transition to either
   (ii) a slave state; or
   (iii) a waiting state from which in the absence of receipt from another network unit of a broadcast advertisement including an advertised address corresponding to an address of the said another network unit, the network unit transitions to
   (iv) a master routing state wherein said routing facility is enabled and the network unit broadcasts a corresponding advertisement including an address of the unit; and
   wherein the network unit transitions from said waiting state, on receipt from another network unit of said broadcast advertisement, to
   (v) a master bridging state wherein said routing interfaces are disabled and the network unit provides commands for disabling a routing facility of other network units to which the network unit is connected.

15. A network unit according to claim 14 wherein said slave state is a slave routing state wherein said routing interfaces are enabled.

16. A network unit according to claim 14 wherein said slave state is a slave bridging state wherein said routing interfaces are disabled.

* * * * *